United States Patent [19]

Hitterdal

[11] 4,181,910

[45] Jan. 1, 1980

[54] PORTABLE RADAR-DETECTING RECEIVER

[75] Inventor: Allan B. Hitterdal, Woodland Hills, Calif.

[73] Assignee: Northrop Corporation, Los Angeles, Calif.

[21] Appl. No.: 860,388

[22] Filed: Dec. 14, 1977

[51] Int. Cl.² ............................ G01S 7/40; H04B 17/00
[52] U.S. Cl. .................................. 343/18 E; 325/364; 343/774
[58] Field of Search .............. 325/364; 343/18 E, 774, 343/884

[56] References Cited

U.S. PATENT DOCUMENTS

| | | | |
|---|---|---|---|
| 2,243,136 | 5/1941 | Trevor | 343/884 X |
| 2,321,651 | 6/1943 | Caraway, Jr. | 325/364 X |
| 2,545,503 | 3/1951 | Tucker | 325/364 X |
| 3,094,663 | 6/1963 | Siegel | 325/364 |
| 3,371,278 | 2/1968 | Gelushia | 325/364 X |
| 3,500,401 | 3/1970 | Miller et al. | 343/18 E |
| 3,550,008 | 12/1970 | Bright | 325/364 X |
| 3,641,436 | 2/1972 | Fukata | 325/364 X |
| 3,657,655 | 4/1972 | Fukata | 325/364 X |
| 3,660,844 | 5/1972 | Potter | 343/18 E |
| 3,795,914 | 3/1974 | Pickles | 343/774 X |
| 3,978,797 | 9/1976 | Harrington | 343/774 X |

Primary Examiner—Malcolm F. Hubler
Attorney, Agent, or Firm—William W. Rundle; Willard M. Graham

[57] ABSTRACT

A hand-carried and self-contained receiver and indicator for producing a signal when the presence of pulsed (or pulsed doppler) radar operation is detected, either in a broad band containing all the common radar pulse frequencies, or in a limited band whereby those outside the band are rejected. A simple biconical horn antenna is provided at one end of a very short coaxial line leading to a broadband detector. From the detector, a flexible transmission line connects to the remaining receiver circuitry containing, in one mode of operation, an amplifier, a limiter, a retriggerable multivibrator and an audible beep type of tone generator driving an earphone. In another mode of operation, the retriggerable multivibrator is replaced by a dual tuned circuit having a substantially restricted bandwidth for passing only a desired pulse frequency signal.

2 Claims, 6 Drawing Figures

PORTABLE RADAR-DETECTING RECEIVER

BACKGROUND OF THE INVENTION

1. Field of the Invention

The present invention relates to radar, and more particularly, to a simple portable radar detecting device which can be carried aboard a vehicle to give an audible and visual indication when pulsed radar is detected operating in the vicinity. When the vehicle is an airplane, the pilot is thus made aware that a radar equipped installation may be attempting to track him, and evasive maneuvers and/or other desired action may be taken.

2. Description of the Prior Art

Aircraft operating in a radar environment often do not wish to be "seen" or detected by unfriendly radar equipped bases or vehicles. In the prior art, it is common to employ electronic counter-measures (ECM) to avoid being picked up and tracked by such radar. The ECM takes many forms and can be very complex.

If a broadband radar detecting device is employed aboard an aircraft and the aircraft itself has an operating radar system, the detecting device will of course indicate the onboard radar and thus will not inform the pilot or radar operator of other radar in the vicinity. Known existing radar detecting devices have this undesirable characteristic.

SUMMARY OF THE INVENTION

It is an object of the present invention to provide a device enabling the pilot of an aircraft not equipped with ECM to improve its performance in a radar environment.

Another object of this invention is to provide a radar detecting device which is self-contained and portable, including power supply, antenna, receiver, and alarm indicator or indicators.

A further object is to provide a detection device which will not detect a pulsed radar of a certain type carried by the aircraft or other vehicle having the detector therein, but will detect a pulsed (or pulsed doppler) radar of other types in the vicinity.

Briefly, a first form of my invention comprises the combination of an antenna, bandpass filter, broadband detector, amplifiers as required, alarm energizing means responsive to detector output, and an audible or visible alarm activated by the energizing means. The antenna is preferably a biconical horn or other small type fixed at one end of a short length of rigid transmission line, the other end connected to a broadband detector. Another transmission line leads to a pocket-size box. The box contains small batteries, integrated circuits, and a connector into which is plugged the leads to a miniature earphone.

The alarm energizing or control means may comprise a retriggerable multivibrator gating a beep type tone from a tone generator to the earphone, with suitable logic control circuits. A lamp may also be illuminated. This form of the invention detects all pulsed radars in the carrier frequency range passed by the antenna, filter and broadband detector.

In the second, and preferred, form of my invention, the detection device does not indicate operating pulsed radars wherein the modulation is pulses of a certain relatively low pulse repetition frequency (prf), but does indicate radars of a given higher prf. This second form of the invention, in addition to the retriggerable multivibrator, has a relatively broad tuned circuit, or two separated-frequency tuned circuits, together with switching means to switch out the retriggerable multivibrator and switch in the tuned circuit(s).

DESCRIPTION OF PREFERRED EMBODIMENT

Figure 1:
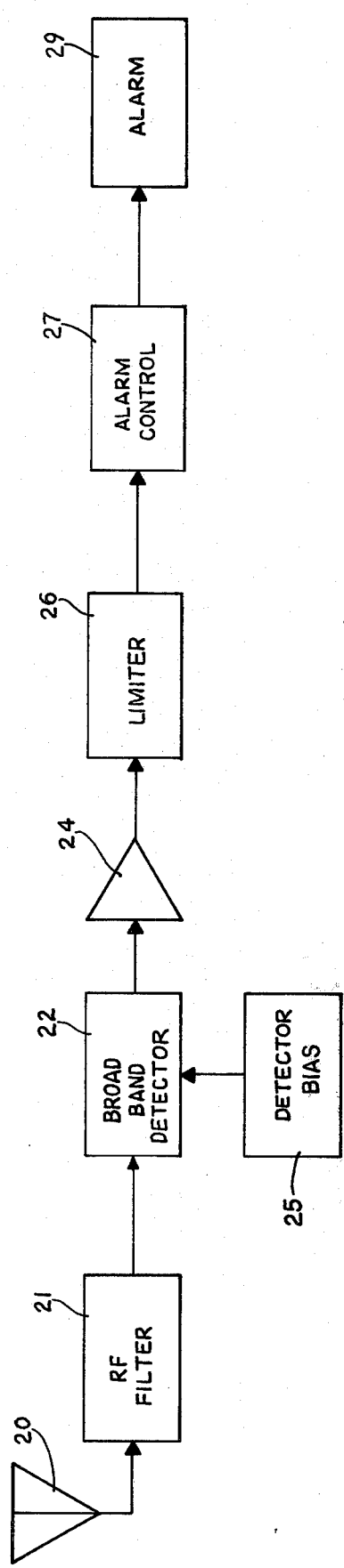
FIG. 1 is a block diagram showing the present invention in its most basic form.

FIG. 1 shows the basic elements of the present invention. An antenna 20 feeds a radio frequency filter 21, which may be a bandpass filter operating in the range of 9000 to 9800 MHz, for example, or just a high-pass filter consisting, for example, of a short section of waveguide. A broadband detector 22 separates the radar modulating pulses from the carrier and feeds the pulses to a video amplifier 24. The detector 22 may be the common diode type (shown by numeral 23 in FIG. 2) and may be provided with a small forward bias circuit 25 for best performance, if the diode used requires bias. The output of amplifier 24 does to a limiter 26 to provide constant amplitude pulses. Whenever pulses are present, they trip an alarm control circuit 27 which in turn energizes an alarm 29. Alarm 29 may be any suitable type of warning indicator, preferably an audible type of device.

Figure 2:
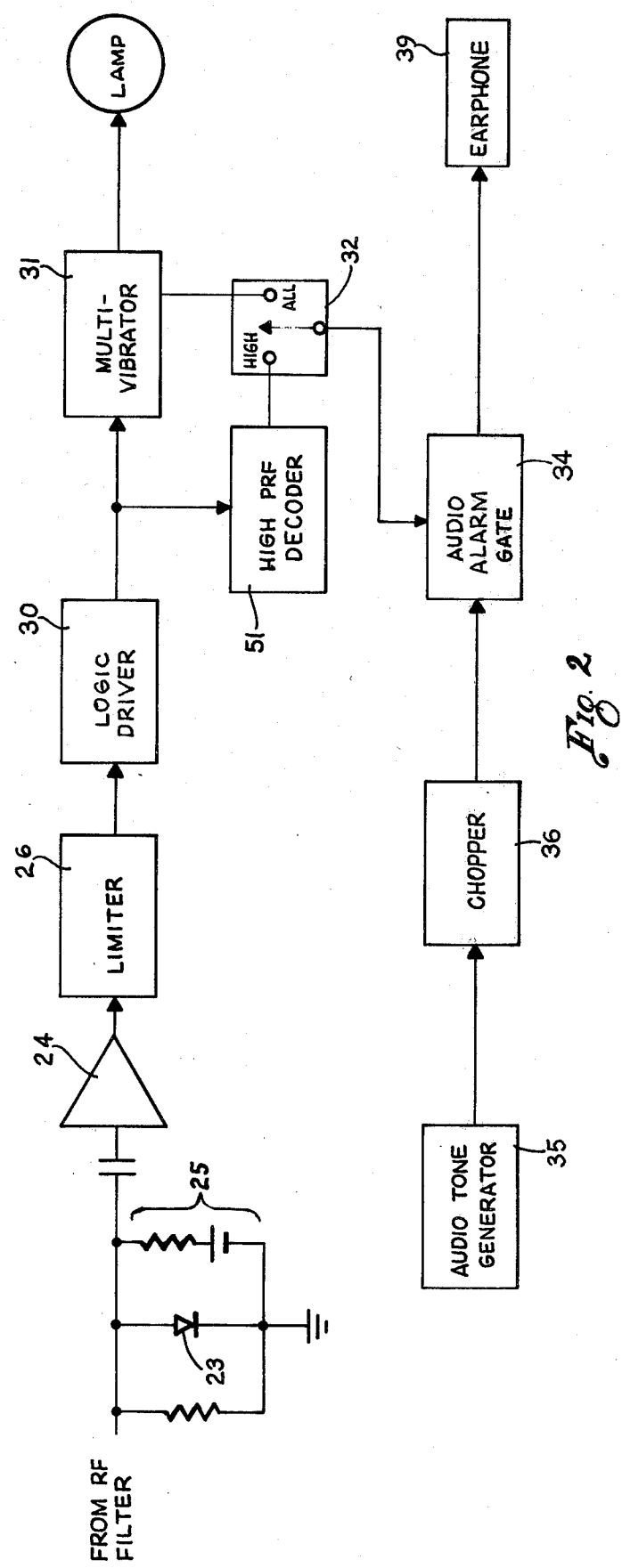
FIG. 2 is a block diagram showing two detection operation modes and a preferred type of alarm system for the present invention.

One preferred alarm control and alarm is shown in FIG. 2. Here, a logic driver 30 (which may be merely a saturable transistor amplifier) receives pulses from limiter 26 and outputs them to a retriggerable monostable multivibrator 31. Each pulse triggers the multivibrator "on" or re-triggers it to keep it "on" all the while pulses are present, since the "on" time of the multivibrator 31 is purposely made to be longer than the pulse period of known radar systems.

The multivibrator output is therefore a high voltage or a low voltage fed to the "all" position contact of a mode switch 32, in accordance with either the presence or absence of pulses, respectively. The mode switch 32 is a manually controlled switch also having a "high" position contact which will be discussed later.

From the mode switch 32, the signal produced by incoming radar pulses goes to a first input of an alarm gate 34. An intermittent audible tone comes from an audio tone generator 35 and chopper 36 to the second input of the alarm gate 34, and the gate output is connected to an earphone 39 to be worn by the vehicle operator or other monitoring personnel. An audio amplifier (not shown) may be provided between alarm gate 34 and earphone 39 if desired.

Figure 3:
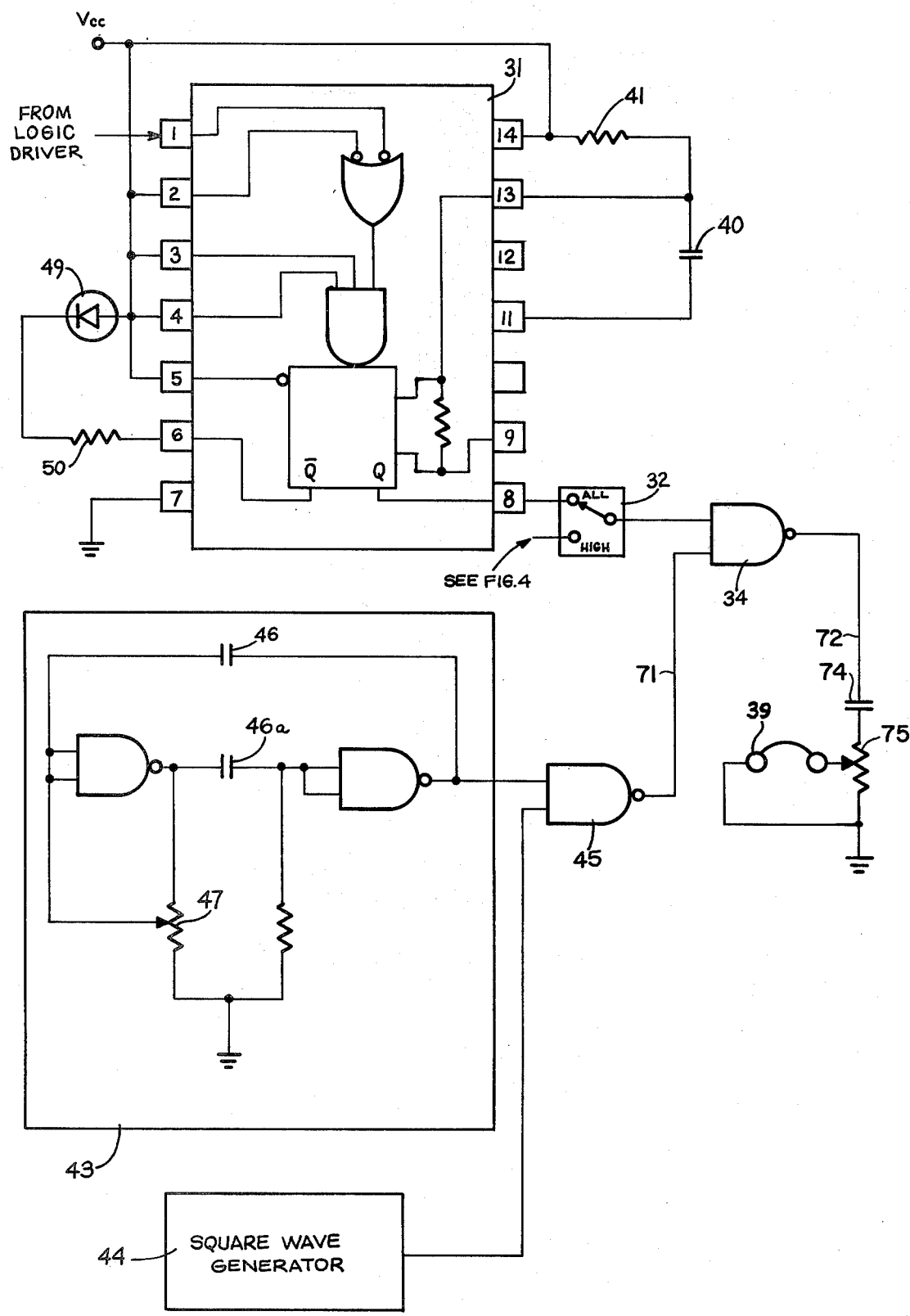
FIG. 3 is a schematic diagram showing the circuitry of FIG. 2 using the multivibrator.

FIG. 3 shows details of the multivibrator-driven alarm circuit. The monostable multivibrator 31 shown here, for example, is a commercial retriggerable monostable multivibrator (with clear) produced in integrated circuit form. The output from the logic driver 30 is connected to input terminal 1 of the multivibrator 31. The dc signal at this point is at a high level when no radar pulses are being received (detected) and is a train of negative-going square pulses at the modulating pulse repetition frequency (prf) when a pulsed radar signal is being received. Other input terminals 2, 3, and 4 of multivibrator 31 are connected to a voltage supply point $V_{cc}$ which may be +6 volts for example. Also, the clear terminal 5 and $V_{cc}$ terminal 14 are connected to $V_{cc}$. A timing capacitor 40 is connected from $C_{ext}$ terminal 11 of multivibrator 31 to $R_{ext}$ terminal 13, and a timing resistor 41 is connected from $R_{ext}$ terminal 13 to $V_{cc}$. The values of these timing elements determine the desired "on" time of multivibrator 31 in response to just one input pulse. The Q output terminal 8 is connected to the "all" position contact of mode switch 32, and its voltage signal is + or high as long as radar pulses continue.

As also shown in FIG. 3, the audio tone generator 35 and chopper 36 of FIG. 2 consist of two square wave generators (free-running multivibrators) 43 and 44 having their outputs respectively connected to the two inputs of a NAND gate 45 whose output is connected by a wire 71 to the second input of the alarm gate 34. The generators 43 and 44 may each comprise a pair of NAND gates interconnected as shown for the first generator 43. The generators are designed to have an output of 3 pulses per second and 500 Hz, respectively, for example. To accomplish this, coupling capacitors 46 and 46a of first generator 43 are of different capacities than their counterparts in second generator 44, and potentiometer 47 is adjustable as desired. An audio lead 72 carrying a coupling capacitor 74 and volume control 75 connects the earphone 39 to the output of alarm gate 34 as shown further in FIG. 3.

Thus it is seen that, in the "all" position of mode switch 32, whenever a pulsed radar system is operating in the vicinity, a series of 500 Hz beeps will be heard at the rate of 3 per second in this example. No signal is heard in earphone 39 when no pulsed radar is within receiving range since the output of the alarm gate 34 is a straight dc voltage. In the "all" position, pulsed radars having a prf of from less than 300 Hz up to several hundred KHz can be detected.

A visible alarm may also be provided by this radar detector. In FIG. 3, a low-current lamp 49 and a series resistor 50 are connected from the complementary ($\overline{Q}$) output terminal 6 of the multivibrator 31 to $V_{cc}$. The lamp 49 may be a light-emitting diode, for example. When no detected radar pulses are present, the lamp 49 is unlit since both sides of it are at the positive $V_{cc}$ potential. When such pulses are present, $\overline{Q}$ terminal 6 is low, and lamp 49 will be continuously lit to indicate the detected radar.

Now consider that the radar detector may be carried in a vehicle having its own pulsed radar system. When the on-board radar is operating, the detector will obviously respond to it and no indication of outside radar will be obtained. In order to provide for this circumstance, a high prf decoder 51 is employed as further shown in FIG. 2. The input of decoder 51 is permanently connected to the output of the logic driver 30, and the decoder output is connected to the "high" position contact of the manually operated mode switch 32.

Figure 4:
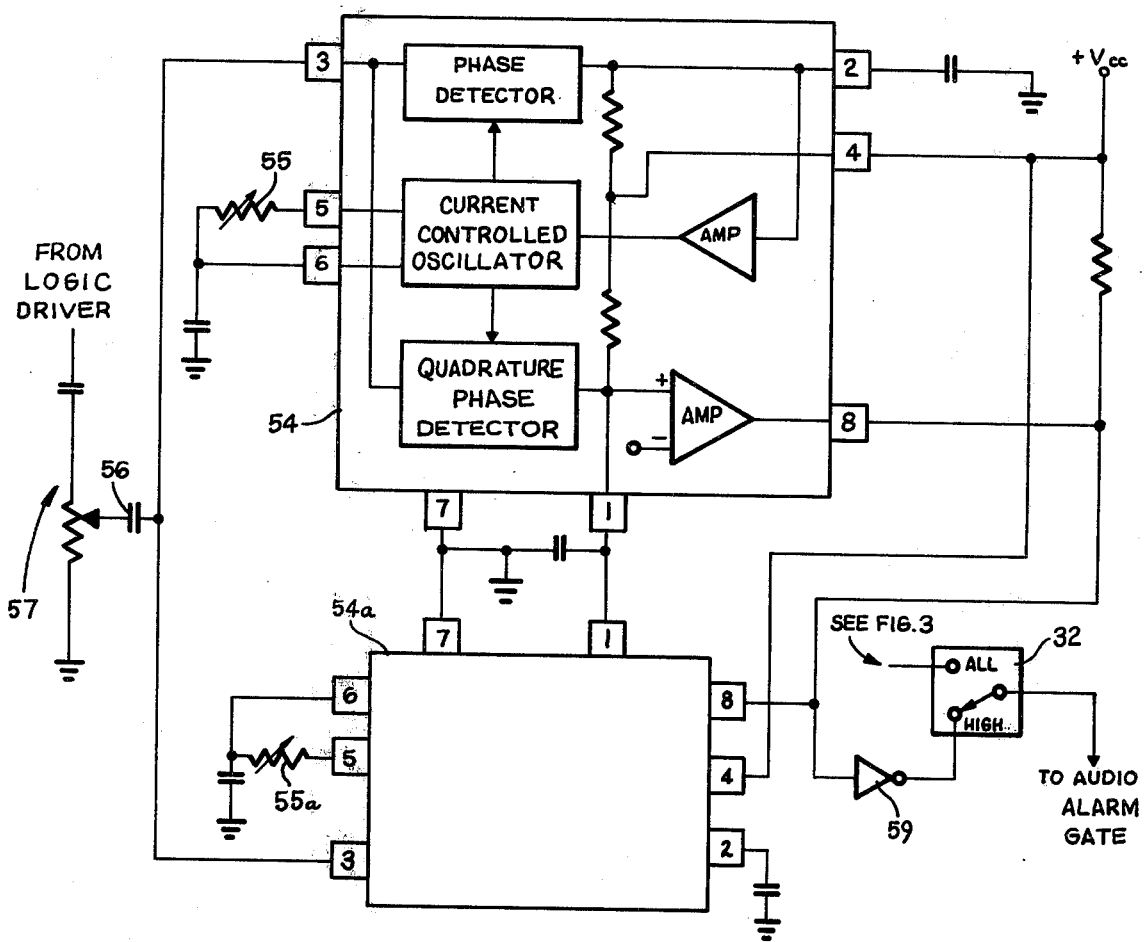
FIG. 4 is a schematic diagram showing the circuitry and connections of a high prf decoder into the system of FIG. 2.

FIG. 4 shows details of the high prf decoder 51. It is comprised of a pair of conventional tone decoder phase locked loops 54 and 54a connected in parallel with each other and tuned to appreciably different center frequencies. Such commercial tuned circuits are available in integrated circuit form with a detection bandwidth which is determined by selection of external components. Broadly, the bandwidth can be from less than 1% to about 14% of center frequency. The center frequency of each is selectable over a broad range by adjustment of a frequency-determining variable resistor 55 or 55a connected between oscillator terminals 5 and 6 of each phase loop 54 and 54a.

The output of the decoder loop 54 or 54a on output terminal 8 thereof is a low level dc voltage when the pulse frequency at the input terminal 3 is within the loop's detection band as determined by its center frequency adjustment. When the input is at a prf outside the detection band, the decoder loop output is a high level dc voltage. Of course with two parallel-connected loops, the combined output will be low whenever the input is within the detection band of either loop.

Loop input terminals 3 of loops 54 and 54a are connected together and to an input capacitor 56 connected to the output stage of the logic driver 30 by an RC coupling circuit 57. The loop output terminals 8 are connected together and then through an inverter 59 to the "high" position contact of the mode switch 32. Thus the signal polarities at the mode switch 32 from either the multivibrator 31 or the high prf decoder 51 are the same.

As an example, assume that the center frequencies of the decoder loops 54 and 54a are 100 KHz and 114 KHz, and the mode switch 32 is in the "high" position. Any radar whose prf is between about 93 KHz and about 121 KHz will be detected and an audible warning signal will be heard in the earphone 39. If the on-board radar of the vehicle in which this detecting device is carried is operating with a prf of 4000 or 5000 Hz, for example, it will certainly not interfere with the detection and indication of the high prf outside radar and no warning signal will be heard in the earphone 39. In fact, any prf outside of the approximate band of 93 KHz to 121 KHz will not be detected in this example. However, all pulsed radars will be indicated by the illumination of lamp 49 in FIG. 3, regardless of the position of mode switch 32.

The two decoder phase locked loops 54 and 54a can be tuned closely together so that their detection bands overlap, or farther apart so they are separated entirely. Further, more than two of the tuned loops can be used, so that the overall resulting detection band can be increased.

Figure 5:
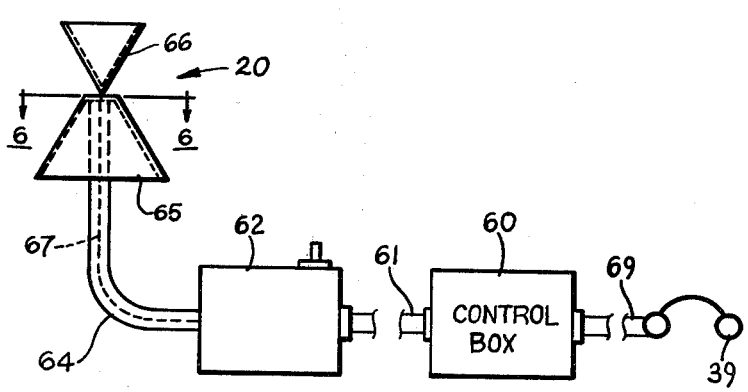
FIG. 5 is a pictorial elevation diagram of the present detecting system showing the physical arrangement of its main components and antenna.
Figure 6:
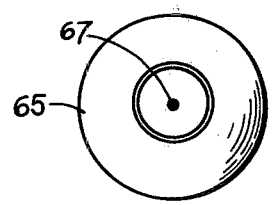
FIG. 6 is a plan view of the lower antenna portion and upper end of the connecting coaxial line, viewed as indicated by the broken line 6—6 in FIG. 5.

As pointed out hereinbefore, the present radar detector is self-contained and portable. The preferred hardware components are as shown in FIGS. 5 and 6. A pocket-size control box 60 has the circuitry including the video amplifier 24 through the audio alarm gate 34 located therein, and it also carries the components of the detector bias circuit 25, small batteries, a transmission line connector, an earphone plug receptacle, on-off switch, the indicator lamp 49 and the mode selector switch 32. A flexible lead-in transmission line 61 connects the control box 60 to a small rf section 62 carrying the detector 22 and rf filter 21. The rf section 62 may comprise a small waveguide section with appropriate coupling adapters and exterior receptacle for a removable detector diode.

To the opposite end of the rf section 62 from the flexible line 61, a rigid coaxial line 64 is connected, its length being selected to fit the particular installation requirements. In one example, this is about seven inches. The rigid coax 64 is bent through a gradual 90-degree turn, for example, to have the antenna 20 installed at the outer end. The biconical type antenna 20 comprises a lower metallic cone 65 soldered to the outer conductor of the rigid coax 64 as shown in FIG. 5. At a central hole in the base of the lower cone 65, an upper metallic cone 66 has its closed apex soldered to the end of the center conductor 67 of the rigid coax 64. The angle of the cones 65 and 66 and their height is a function of the desired impedance and the required beam width at the operating frequency. These can be calculated using established formulas.

The rf section 62 with antenna 20 attached can be set on a convenient portion of aircraft cockpit structure just inside the windshield, for example, with the antenna 20 in a vertical position near the windshield or window. If desired, a bracket or band can be made to hold the rf section 62 in place. The antenna 20 is easily supported from the rf section 62 by the rigid coax line 64. The flexible transmission line 61 is long enough to reach from the rf section 62 to the person carrying the control box 60, or to a suitable container in the aircraft which holds the control box 60, such as a map case, and the earphone 39 has a cord 69 of sufficient length to reach from the control box 60 to the person's ear.

Thus it is seen that a small, simple pulsed radar detection device has been provided which is portable so that it can be easily carried aboard an aircraft or other vehicle, for example, for operation without connection to or interference with any system of the vehicle. The antenna is omnidirectional in the plane perpendicular to its axis. The detection device consumes very little power, and can be switched to detect or reject a certain desired band or bands of pulsed or pulsed doppler radar according to the prf of the radar modulation. The alarm portion may be any suitable type of perceptible signal at any suitable operating frequency.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:
1. A portable radar-detecting device comprising:
   a. container means;
   b. a short length of rigid transmission line secured at one end to said container means;
   c. a miniature antenna fastened to the other end of said transmission line;
   d. battery operated circuitry in said container means including a broadband detector and alarm control means responsive to pulses in the output of said detector, said alarm control means comprising a retriggerable monostable multivibrator having an "on" time greater than the period of the pulses to be detected, and means for feeding pulses from said detector to the trigger point of said multivibrator so that the output of said multivibrator is a constant voltage alarmenergizing signal while said multivibrator is "on"; and
   e. alarm means operatively connected to said alarm control means, said alarm means comprising a first generator (43) for producing an audio tone, a second generator (44) for producing a pulse type signal at a frequency substantially less than an audio tone, a first NAND gate (45) having two inputs and an output, the first input of said first NAND gate connected to the output of one of said generators, and the second input of said first NAND gate connected to the output of the other said generator; a second NAND gate (34) having two inputs and an output, means (71) connecting the first input of said second NAND gate (34) to the output of said first NAND gate (45), and means (32) connecting the second input of said second NAND gate (34) to the output of said multivibrator (31); an earphone (39); and signal coupling means (72) connecting the input of said earphone to the output of said second NAND gate (34).

2. A portable radar-detecting device comprising;
   a. container means;
   b. a short length of rigid transmission line secured at one end to said container means;
   c. a miniature antenna fastened to the other end of said transmission line;
   d. battery operated circuitry in said container means including a broadband detector and alarm control means responsive to pulses in the output of said detector, said alarm control means comprising
      (1) a retriggerable monostable multivibrator having an "on" time greater than the period of the pulses to be detected;
      (2) means for feeding pulses from said detector to the trigger point of said multivibrator, the output of said multivibrator being a constant "on" voltage magnitude while said multivibrator is "on";
      (3) tuned circuit means tuned to a given limited band of pulse repetition frequencies in the high portion of the radar pulse frequency range;
      (4) means for feeding pulses from said detector to the input of said tuned circuit means as well as to said multivibrator, the output of said tuned circuit means being a constant "alarm" voltage magnitude produced by detector output pulses within said limited band only;
      (5) selector switch means having an "all" input contact and a "high prf" input contact respectively connectable alternately to an output contact;
      (6) said multivibrator output connected to said "all" input contact; said tuned circuit output connected to said "high prf" input contact; and
   e. alarm means operatively connected to the output contact of said selector switch means.
   * * * * *